Patented Jan. 14, 1936

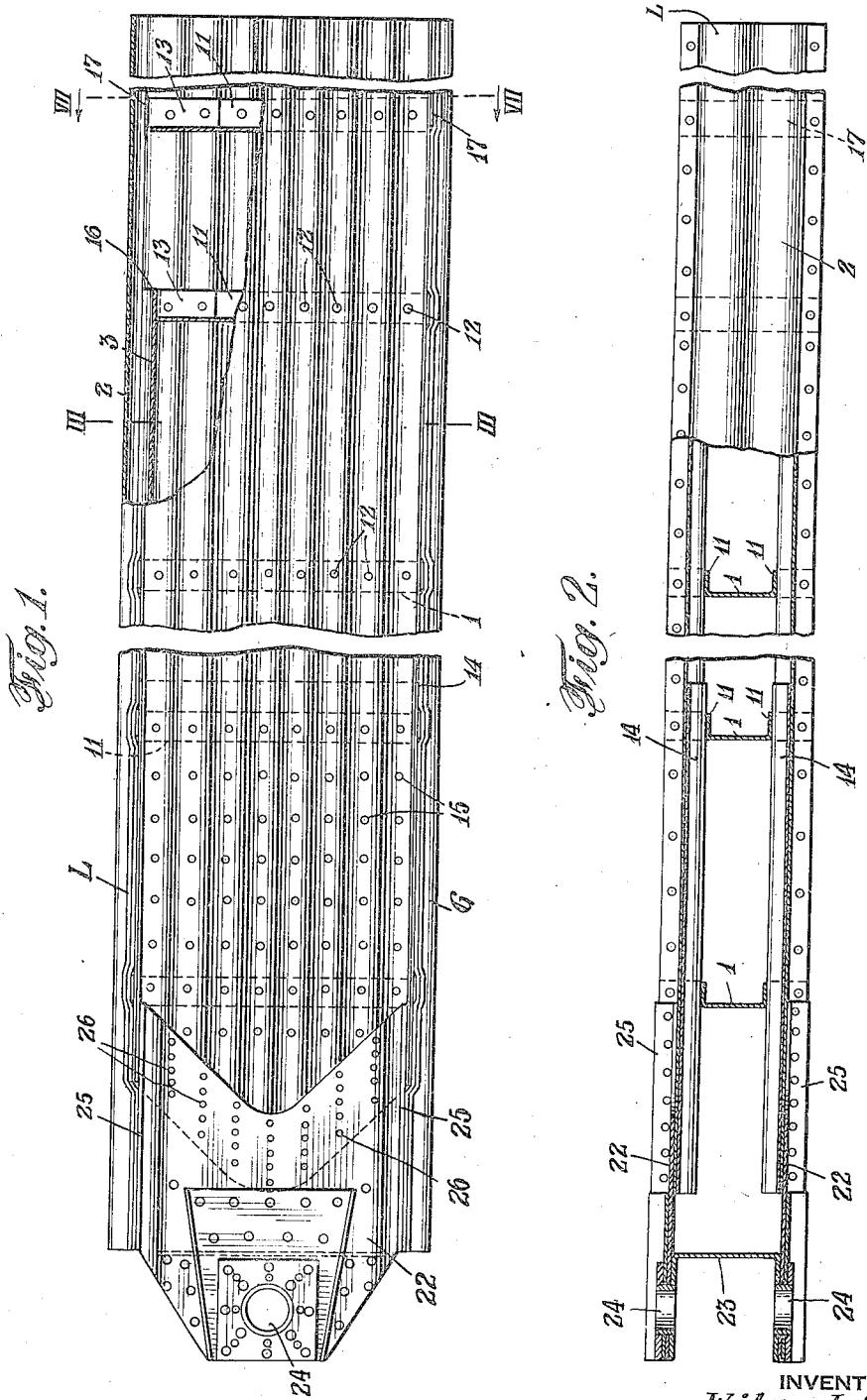

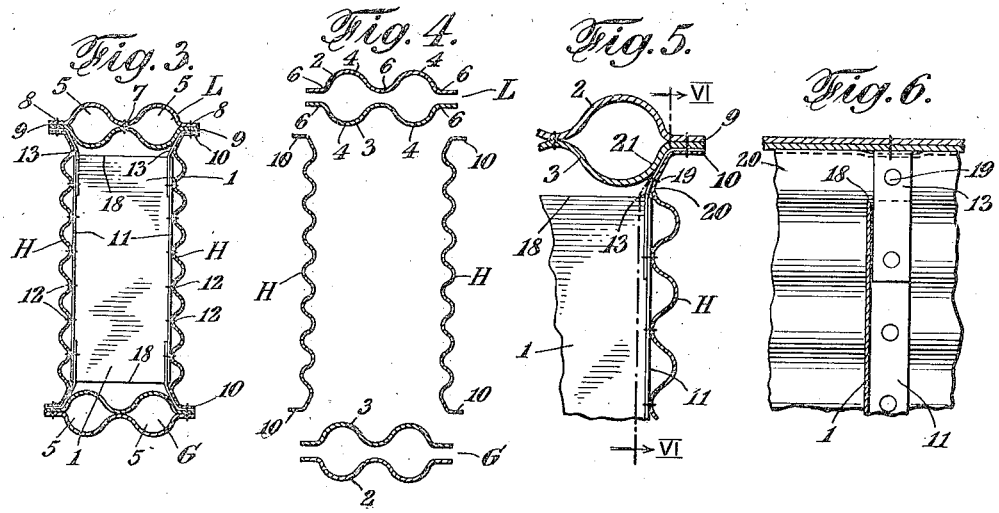
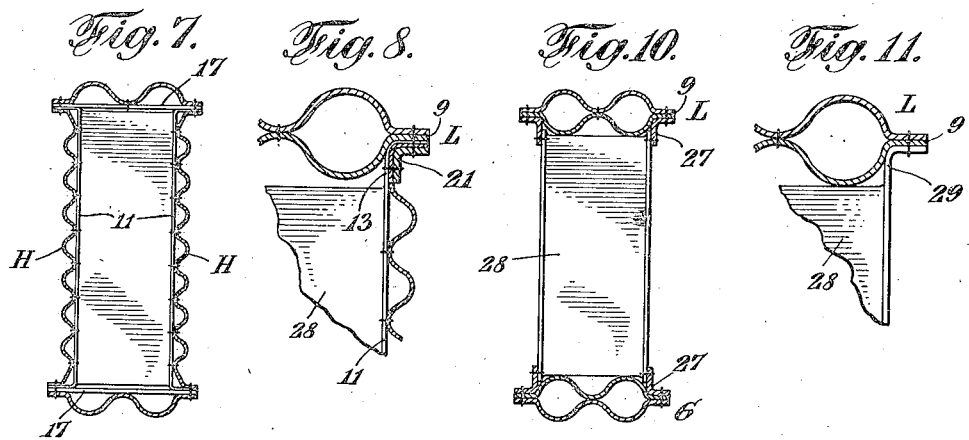
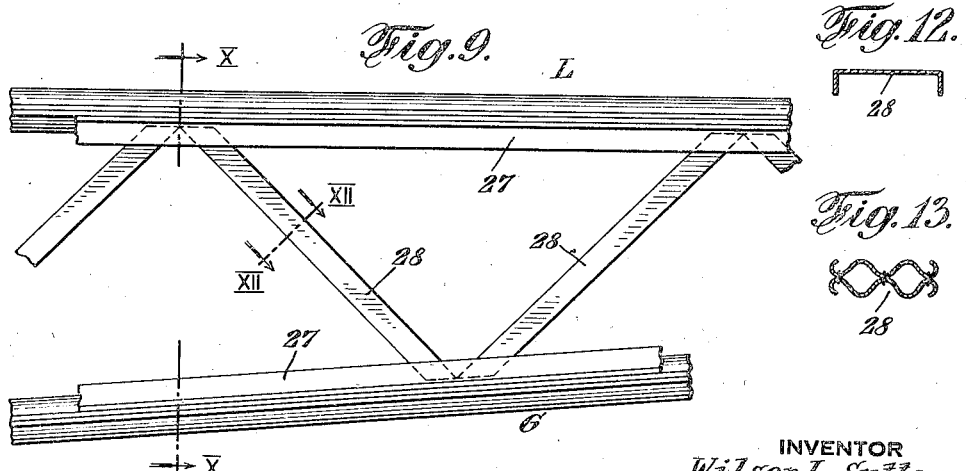

2,027,711

UNITED STATES PATENT OFFICE 2,027,711

SPAR STRUCTURE

Wilson L. Sutton, Long Island, N. Y., assignor to Fleetwings, Inc., Garden City, Long Island, N. Y., a corporation of Delaware Application January 7, 1933, Serial No. 650,625

5 Claims. (Cl. 189—37)

This invention relates to a spar structure. While the invention is particularly applicable to spars intended for use in airplane construction, it is applicable for use in various other connections as well.

An object of the invention is to provide a spar which is of the greatest possible strength as compared with its weight, said spar being thereby particularly adapted for use in the construction of airplanes, airplane wings and the like.

A further object is to provide a spar which, notwithstanding its great strength, is of a practical form suitable for easy manufacture, symmetrical and attractive in appearance and capable of being produced at small cost.

A further object is to provide a spar which will be highly efficient in withstanding strains of various kinds, that is endwise, tension and compression strains, vertical and lateral bending strains, and shearing strains.

A further and more specific object is to provide a spar which will have an extremely high form factor.

A further detailed object is to so design and construct the spar that the center of gravity of its top and bottom chords respectively will be as far as possible removed above and below the neutral axis of the spar, considering the over-all height of the spar, so as thereby to increase the efficiency of said cords and of the spar in general.

A further detailed object is to so construct the spar that the top and bottom chords thereof include reinforcing elements in such disposition and character as to greatly strengthen said chords and stand failure proof until after failure of the other or main portions of said cords.

A further detailed object is to so construct the spar as to include, in association with longitudinally corrugated sheet metal webs, certain diaphragms so disposed and connected with said corrugated webs and with the cords of the spar as to produce a structure highly efficient in withstanding strains, of end load and otherwise, to which the spar may be subjected.

A further detailed object is to so construct the spar that in addition to the other features as above enumerated, it will be as nearly as possible devoid of any localities subject to local failure or permanent wrinkling until design load has been reached.

A further detailed object is to so construct the spar as to include top and bottom chords which are highly efficient irrespective of whether the web portions of the spar are of the closed or box type, or of the open or truss type.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view of a spar constructed in accordance with this invention.

Fig. 2 is a top plan view, partly in horizontal section, of the structure seen in Fig. 1.

Fig. 3 is a transverse sectional view substantially upon the plane of line III—III of Fig. 1.

Fig. 4 is a view similar to Fig. 3 but showing the principal component parts of the spar as being disconnected and spaced so as to be more readily discernible to the observer.

Fig. 5 is an enlarged detail fragmentary sectional view showing the manner of connecting the chords with the webs and diaphragms.

Fig. 6 is a vertical sectional view on the plane of line VI—VI of Fig. 5.

Fig. 7 is a sectional view similar to Fig. 3 but taken upon the plane of line VII—VII of Fig. 1.

Fig. 8 is a view similar to Fig. 5 but illustrating a slightly modified structure.

Fig. 9 is a side elevational view of a portion of the length of a truss type spar embodying this invention.

Fig. 10 is a transverse sectional view substantially upon the plane of line X—X of Fig. 9.

Fig. 11 is a view similar to a portion of Fig. 10 but illustrating a slightly modified construction.

Fig. 12 is a detail sectional view of one of the truss braces of Fig. 9, being a section upon the plane of line XII—XII of Fig. 9, and Fig. 13 is a view similar to Fig. 12 but suggesting the use of longitudinally corrugated members for the truss braces.

Referring to the drawings for describing in detail the structures as illustrated therein, and referring first to the box girder type of spar illustrated in Figs. 1 to 7, the reference characters L and G indicate the top and bottom chords respectively of the spar structure. These are spaced apart and connected together by opposite side webs H—H.

The top and bottom chords L and G are identical with each other, and the opposite side webs H—H are likewise identical with each other, and interiorly of the box formed by these parts assembled is arranged a series of separate diaphragms as 1—1 spaced apart appropriate distances lengthwise of the spar and rigidly connected with their enveloping elements.

The chords each consist of a relatively outer member 2 and a relatively inner member 3, these members being symmetrically corrugated, as by draw-rolling, and being identical with each other but being positioned in reversed arrangement so that the concaved portions as 4—4 of the two members face each other and define, preferably two hollow tubular spaces as 5—5 between the two members. The relatively convexed portions as 6—6 of the two members abut together and are welded or riveted rigidly to each other both between the tubular portions 5 as indicated at 7 and outside said tubular portions 5, as indicated at 8—8, thus making the two members serve as one single and complete unit.

The longitudinal portions of the two members outside the tubular portions 5—5 lie flat together in a plane midway between the extreme top and bottom surface planes of the convexed portions 4—4 and constitute double thickness reinforcing sections longitudinally at the opposite marginal edges of the chord. The longitudinal portions of the two members intermediate the two tubular portions, along the welded or riveted joint 7, likewise lie in the common plane of the welded or riveted portions 8—8 and constitute a double thickness re-inforcing section longitudinally of the median line of the chord.

The longitudinal portions of the two members outside the tubular portions 5—5 project in opposite directions as flanges, indicated generally by the reference character 9—9 and by which the chords may be connected with the webs H—H.

The tubular portions of the chords, with respect to the thickness of the sheet metal of which the cords are formed have a $d/t$ ratio which varies from 15 to 45.

The webs H—H may be of any type, either of flat sheets, truss or corrugated. In the structure Figs. 1 to 7 they are of longitudinally corrugated sheet metal, formed preferably by draw-rolling a thin sheet of metal with corrugations having a ratio of pitch to depth varying from 3 to 4. At their top and bottom margins they are formed with outstanding flanges as 10—10 which engage against the flanges 9—9 of the chords and are fixed thereto in a suitable manner as by spot welding or riveting.

The diaphragms 1—1 may be formed in any appropriate manner but in the instance being described they are formed of sheet metal of approximately the same thickness as that employed for the webs H—H, which is somewhat less than the thickness of sheet metal employed in the formation of the chords. Their longitudinal vertical edge portions are formed with lateral flanges as 11—11 disposed to rest firmly against the inwardly convexed surface portions of the corrugated webs and are fixed rigidly to said webs by suitable fastening means such as spot welding or riveting, through said flanges and through said inwardly convexed portions, as indicated at 12—12, so that the two spaced webs are firmly connected together for mutual re-inforcement. At their upper and lower ends the main portions of the diaphragms terminate short of the flanges 11—11, the flanges being continuous and extending in interposed relation between the flanges 8 of the chords and the flanges 10 of the webs and are firmly fixed by suitable means such as welding or riveting. If desired the extending portions, as 13—13 of the flanges 11—11 may be separately attached pieces, as indicated in Figs. 3 and 5, but this is merely a matter of convenience and economy of manufacture.

The diaphragms 1—1, collectively, greatly strengthen the spar in withstanding strains, particularly strains due to end load, and strains tending to cause deflection due to vertical shear.

At the inner, or anchoring, end of the spar, or elsewhere as may be required, where the strains are greatest, the webs H—H may have one or more additional thicknesses as 14—14 added thereto and fixed rigidly thereagainst, by suitable fastening means such as rivets or spot welding as indicated at 15—15 in Fig. 1.

At the outer end of the spar, or elsewhere as may be required, where the strains are least, the relatively inner members 3 of the chords may be discontinued, as indicated at 16 in Fig. 1, and in lieu thereof one or more simple light straight tie straps 17—17 may be employed each having its opposite ends extending into and fixed in the joint between the flanges 8 and 10 in the same manner as does the member 3 as already described, and as clearly illustrated in Figs. 1 and 7.

The extending portions 13 of the diaphragms 1—1, whether integral parts of said diaphragms or separate parts fixed to the diaphragms, are, preferably, fixed rigidly to the material of the web H, not only in the joint between the flanges 9 and 10, but also in the regions between the end edges 18—18 of the main portion of the diaphragm and the flanges 10, as at 19, the fastening means employed being of suitable type such as spot welding or riveting, and the location being as near to the end edges 18 as possible, the material of the webs H being so formed in this location as to provide longitudinal portions as 20 just inside of the flanges 19 and disposed so that said portions and the extensions 13 will lie flat against each other, and so that said portions will also lie flat against the adjacent opposing portions as 21 of the inner members 3 of the top and bottom chords.

This arrangement of parts, as most clearly illustrated in Fig. 5, provides great strength in the joint between the webs H the chords G and L and the diaphragms 1, being particularly efficient against failure in this locality which may result not only from direct load strains but also from vibration and other causes.

The modification Fig. 8 suggests that if desired the regions of the joint between the chords, webs and diaphragms may be further re-inforced by the use of an additional re-inforcing member as for instance the longitudinally extending angle 21, such angle continuing either for the whole length of the spar or for such portions of the length as may require additional strengthening, and said angles being preferably held by the same rivets or spot welds, or other fastening means as already described for holding the other adjacent parts of the structure assembled.

Any suitable form of structure may be connected at the inner or anchoring end of the spar, for appropriately connecting the spar in position in the structure of which it is intended to form a part, as for instance to the fuselage structure of an airplane, and to this end the drawings herewith, Figs. 1 and 2, illustrate the anchoring end of the spar to be fitted with opposite heavy side plates as 22—22 having portions extending beyond the inner end of the spar and connected together by a U-shaped member 23, the extending portions being provided with bearing openings or the like as 24—24 for convenient attachment for instance to the fuselage structure of an airplane.

The plates 22 are rigidly connected with the top and bottom chords of the spar by having flanges 25—25 fixed to the marginal flange portions of the chords as by the same fastening means, for instance the rivets or spot welds, as are employed for fixing together the flange portions of said chords, as hereinabove set forth, and as clearly indicated in Fig. 2.

The plates 22 are rigidly connected with the webs H—H by resting flat against the outwardly convexed portions of the corrugations of said webs and by being fixed to said convexed portions by suitable fastening means such for instance as the spot welds or rivets 26 illustrated in Fig. 1.

While this invention is particularly directed to production of a highly efficient spar of the box girder type, as above set forth, the top and bottom chord members L and G may if desired be employed in the production of a spar of the truss type, and such a spar is accordingly illustrated in the drawings Figs. 9 to 13, wherein it will be seen that the top and bottom chords are of the same construction as already described. These is also present in this structure the angle braces 27—27 similar to the angle braces 21 illustrated in Fig. 8, and these angle braces 27 may be continuous throughout the length of the spar as suggested in Fig. 9, or they may occur only where desired for purposes of strength or for convenient attachment means by which to fix the diagonal truss members 28—28 to the chords.

The diaphragms I, and the webs H—H of the box girder structure, are omitted, and are replaced by the diagonal truss members 28 which may be of any desired cross section either U-shape or otherwise, as indicated in Fig. 12, or they may be of more than one element suitably formed and fixed together, as indicated in Fig. 13.

The upper and lower ends of the diagonal truss members 28 may be rigidly connected with the top and bottom chords either by being fixed to the angle braces 27 as indicated in Figs. 9 and 10, or by having integral portions 29 of themselves extending into fixed connection with the flange portions 9 of the chords as indicated in Fig. 11.

All of the corrugations of the webs H—H are rigidly held against movement with respect to each other by means of the diaphragms which are so designed and arranged as to provide the straight flat flanges 11—11 extending vertically transversely of the webs and fixed rigidly at each of the inwardly convexed portions of the webs. The longitudinal marginal portions of the webs are similarly held against movement with respect to the intermediate portions of the webs by the diaphragm extensions 13—13 as fully above set forth.

The strength of the webs in withstanding shearing strains is thus greatly increased in proportion to the thickness and weight of the sheet metal of which the webs are formed.

The fact that the corrugations of the webs extend in parallel lines longitudinally of the spar, taken together with the rigid attachment of the corrugations against relative movement, and with the rigid connection of the diaphragms and webs with the top and bottom chords, practically eliminates any diagonal wrinkling, or similar failure, of the webs under load within the design capacity of the spar.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. In combination, in an airplane spar, top and bottom chords, opposite side webs and spaced diaphragms extending transversely from web to web, said chords each consisting of two longitudinally corrugated sheet members of similar contour reversely positioned and rigidly connected together so as to form a pair of tubular structures fixed together along the longitudinal median line of the chord and having opposite side re-inforcing flanges, said opposite side webs being corrugated throughout their extent with longitudinally extending corrugations, and said webs having top and bottom longitudinally extending out-flaring flanges to which said chords are fixed, and said diaphragms having portions engaging and rigidly independently fixed to each of the corrugations of said webs, said diaphragms also having other portions extending and fixed to the chords and webs where said chords and webs are fixed together.

2. In combination, in an airplane spar, top and bottom chords, opposite side webs and spaced diaphragms extending transversely from web to web, said chords each consisting of two longitudinally corrugated sheet members of similar contour reversely positioned and rigidly connected together so as to form a pair of tubular structures fixed together along the longitudinal median line of the chord and having opposite side webs being re-inforcing flanges, said opposite side webs being corrugated throughout their extent with longitudinally extending corrugations, and said webs having top and bottom longitudinally extending out-flaring flanges to which said chords are fixed, said webs in the regions adjacent said flanges being shaped to lie firmly against adjacent surfaces of the tubular portions of said chords for mutual reinforcement, and the diaphragms having extending portions sandwiched between the flanges of the chords and webs and fixed thereto.

3. In combination, in an airplane spar, top and bottom chords, opposite side webs and spaced diaphragms extending transversely from web to web, said chords each consisting of two longitudinally corrugated sheet members of similar contour reversely positioned and rigidly connected together so as to form a pair of tubular structures fixed together along the longitudinal median line of the chord and having opposite side re-inforcing flanges, said opposite side webs being corrugated throughout their extent with longitudinally extending corrugations, and said webs having top and bottom longitudinally extending out-flaring flanges to which said chords are fixed, and said spar having plates fixed rigidly to the outwardly convexed portions of said webs and to the flanges of said chords and projecting beyond the ends of said webs as anchoring means for the spar.

4. In a spar, tension and compression chords spaced apart, opposite side webs, and spaced diaphragms extending transversely between and fixed to the webs, said opposite side webs being formed of sheet metal corrugated with corrugations extending longitudinally of the spar, and said webs having top and bottom longitudinally extending out-flaring flanges, the chords being fixed by their opposite longitudinal marginal portions to the adjacent flanges of the webs respectively, and said diaphragms having portions engaging and fixed to the corrugations of the webs, said diaphragms also having other portions extending and fixed to the chords and webs where the chords and webs are fixed together.

5. In a spar, tension and compression chords spaced apart, opposite side webs formed of sheet metal longitudinally corrugated and having longitudinally extending marginal flanges, the chords having opposite longitudinally extending marginal portions secured to the web flanges, spaced diaphragms extending between the webs and fixed to the corrugations of the webs, said diaphragms having portions extending and fixed to the chords and webs where the chords and webs are secured together, and a longitudinally extending reinforcing element reinforcing the joint of the web chord and diaphragm portion.

WILSON L. SUTTON.